UNITED STATES PATENT OFFICE.

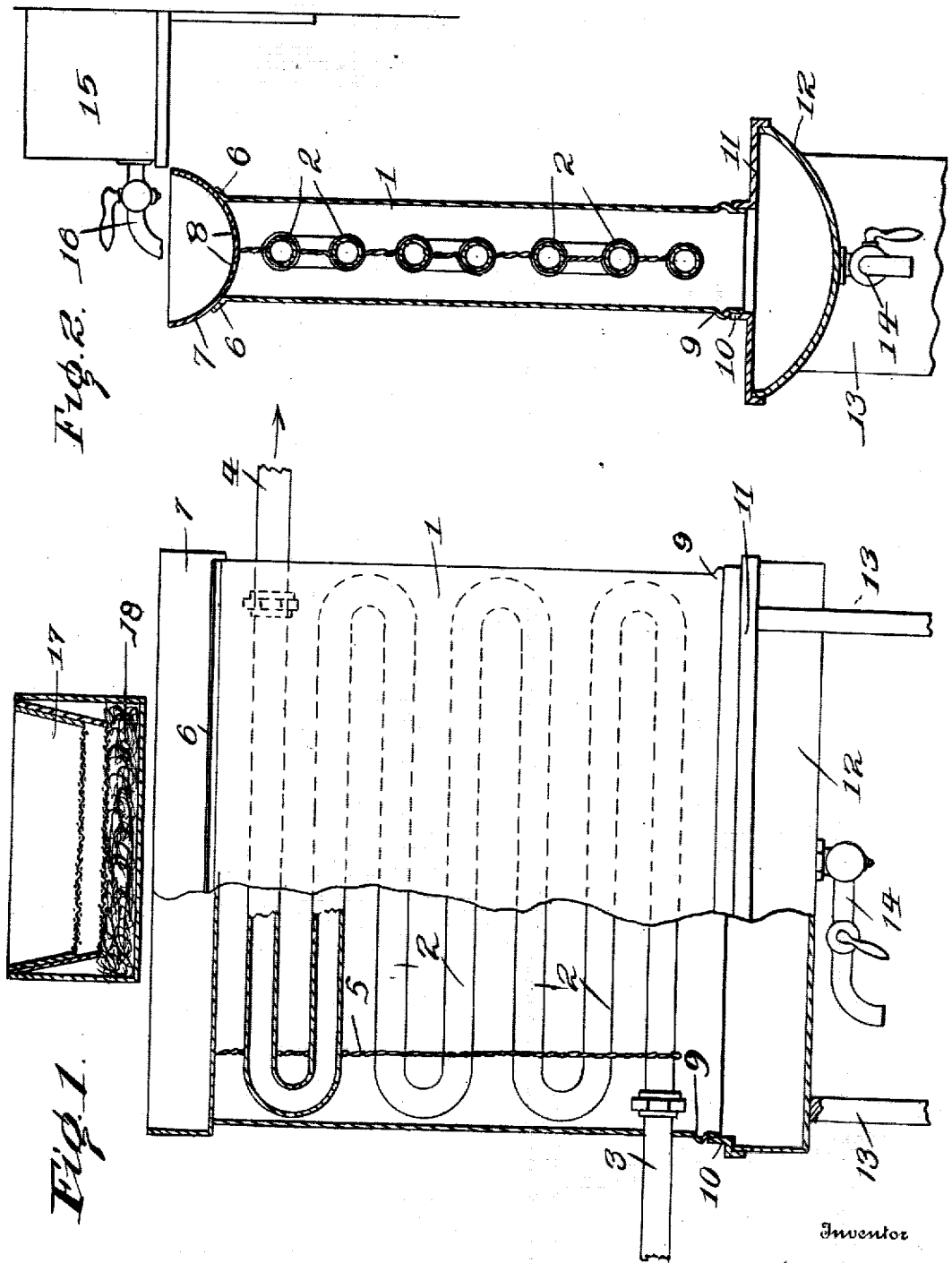

BENJAMIN F. CRAIG, OF DOWNINGTOWN, PENNSYLVANIA.

MILK-COOLER.

No. 828,716.      Specification of Letters Patent.      Patented Aug. 14, 1906.

Application filed December 30, 1905. Serial No. 293,981.

*To all whom it may concern:*

Be it known that I, BENJAMIN F. CRAIG, a citizen of the United States, residing at Downingtown, in the county of Chester and State of Pennsylvania, have invented certain new and useful Improvements in Milk-Coolers, of which the following is a specification.

The present invention relates to an improved milk strainer and cooler; and it consists, essentially, of a straining device and a cooling-pipe over which the milk is forced to flow, said cooling-pipe being so formed as to utilize to the fullest possible extent the heat-absorbing power of the water passing therethrough. Heretofore the principal objection to this type of milk-cooling devices has been that they were unable to withstand the severe uses to which they were necessarily subjected and that it was very difficult to keep them in a clean and sanitary condition.

The object of this invention has accordingly been to design and construct the various parts so as to provide a rigid structure and one which at the same time can be readily taken apart for cleaning purposes.

For a full description of the invention and the merits thereof and also to acquire a knowledge of the details of construction of the means for effecting the result reference is to be had to the following description and accompanying drawings, in which—

Figure 1 is a side elevation, portions being broken away; and Fig. 2 is a transverse sectional view.

Corresponding and like parts are referred to in the following description and indicated in both the views of the drawings by the same reference characters.

The numeral 1 designates the outer casing, and 2 the cooling-pipe which is housed therein. This pipe 2 is bent back and forth upon itself to form a series of horizontal portions which are in vertical alinement with each other and is provided at its lower end with an inlet-pipe 3 and at its upper end with an outlet-pipe 4. These inlet and outlet pipes are preferably detachably connected to the cooling-pipe 2, and when removed therefrom it will be apparent that the cooling-pipe can be readily taken out of the casing 1 and thoroughly cleansed. In order to hold the horizontal portions of the cooling-pipe 2 in a fixed position, reinforcing members 5 may be provided, which are preferably formed by twisting two wires together. The upper edges of the casing 1 are bent outwardly at 6 and form a seat upon which the upper or feeding trough 7 rests. This upper trough 7 is provided with two longitudinal series of openings 8, which are so arranged as to feed the milk upon both sides of the upper horizontal portion of the cooling-pipe 2. The lower end of the casing 1 is formed with a shoulder 9, which engages with the upturned edges 10 of the opening in the cover 11 of the lower trough 12. This lower trough 12 is supported upon suitable standards 13 and is provided with a spout 14, which is so constructed that when one can has been filled the milk can be turned into an empty can without wasting any of it. A tank 15 is supported above the upper trough 7 and a spout 16 is connected thereto which is adapted to deliver the milk into the trough 7. This tank 15 is provided with two strainers 17, of fine cloth and with a third strainer 18, of absorbent cotton. It will thus be apparent that after the milk has passed through these strainers all the solid particles which were in suspension will have been removed, and the milk will be absolutely pure.

In the operation of the device the warm milk is turned into the tank 15 and after passing through the strainers therein and being freed from all impurities is delivered into the upper or feed trough 7. From thence it passes through the openings 8 and flows downward over the vertically-alined horizontal portions of the cooling-pipe 2. It is then collected in the lower trough 12 and delivered through the spout 14 into suitable receptacles. An essential feature of this invention resides in the fact that the water which is employed as a cooling medium is forced to flow upwardly through the pipe 2. In this manner it will be apparent that the warm milk first comes into contact with those portions of the pipe containing water which has already absorbed a certain amount of heat from the milk and which is therefore at a higher temperature than when it first entered the cooling-pipe. As the milk trickles downwardly over the pipes it gradually comes into contact with colder sections of the cooling-pipe, and in this manner the heat-absorbing power of the water or other cooling medium which might be employed is utilized to the fullest possible extent.

Having thus described the invention, what is claimed as new is—

1. In a milk-cooler, the combination of a lower trough, a cover for the lower trough, said cover being provided with an opening the edges of which are bent upwardly, an outer casing the lower end of which fits removably within the opening in the cover, a shoulder upon the lower end of the casing which engages with the upturned edges of the opening in the cover, a cooling-pipe removably housed within the outer casing and bent back and forth upon itself to form a series of approximately horizontal portions in vertical alinement with each other, a seat at the upper end of the casing formed by bending the edges thereof outwardly, and an upper trough removably located upon said seat, said upper trough being provided with a series of openings which are adapted to feed the milk upon both sides of the cooling-pipe.

2. In a milk-cooler, the combination of a lower trough, a cover removably fitted upon the lower trough, said cover being provided with an opening, the edges of which are bent upwardly, an outer casing the lower end of which fits removably within the opening in the cover, a shoulder around the lower end of the outer casing which engages with the upturned edges of the opening in the cover, a cooling-pipe removably housed within the outer casing and bent back and forth upon itself to form a series of approximately horizontal sections in vertical alinement with each other, a reinforcing-wire twisted around the horizontal sections of the pipe to hold them in a fixed relation to each other, a seat at the upper end of the casing formed by bending the edges thereof outwardly, and an upper trough removably located upon the seat, said upper trough being provided with a series of openings which are adapted to feed the milk upon both sides of the cooling-pipe.

In testimony whereof I affix my signature in presence of two witnesses.

BENJAMIN F. CRAIG. [L. S.]

Witnesses:
DAISY M. MAURER,
HARRY W. MAURER.